Figure 3:
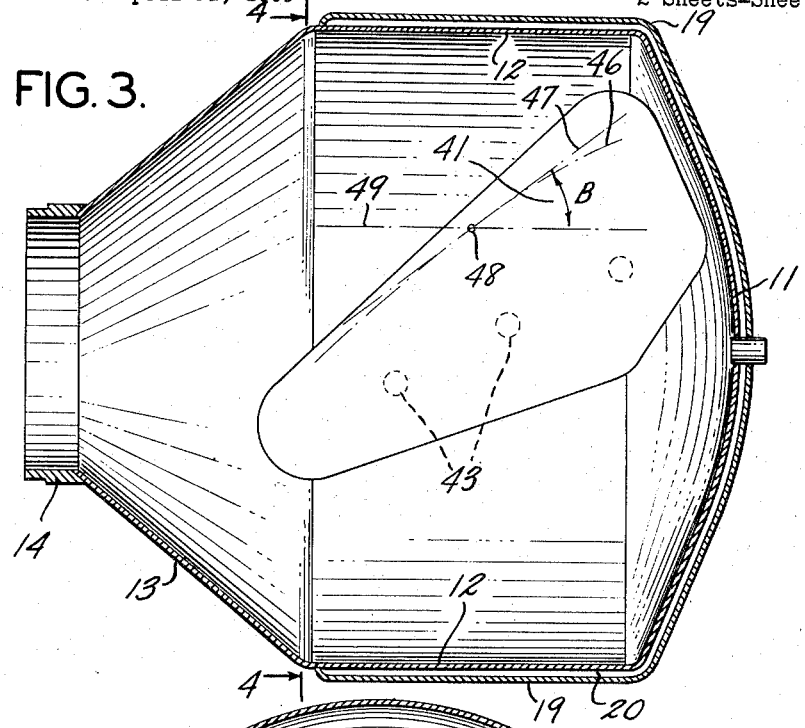

Aug. 20, 1957
C. A. S. THORSTENSSON-RYDBERG
2,803,529
FAT PROCESSING METHODS
Original Filed April 11, 1951
2 Sheets-Sheet 1
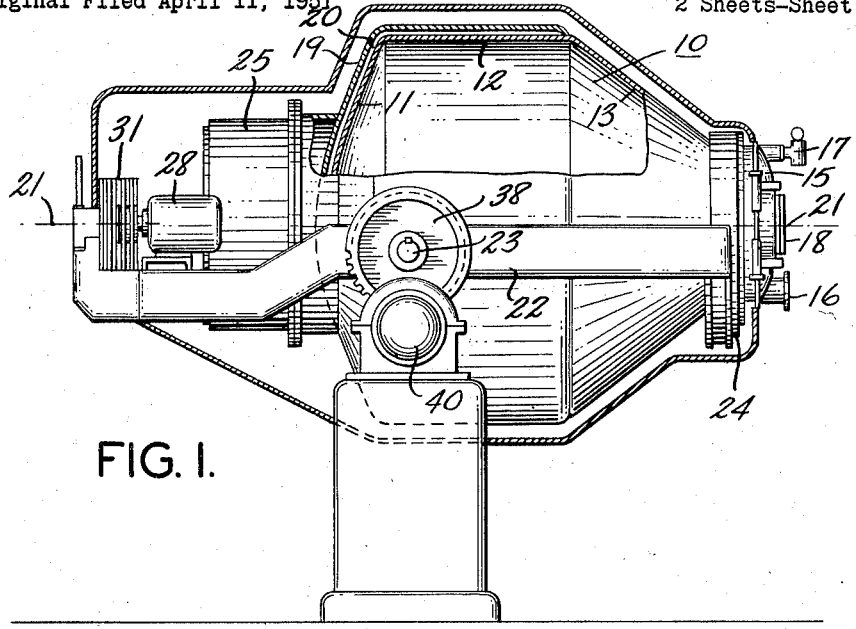
FIG. I.
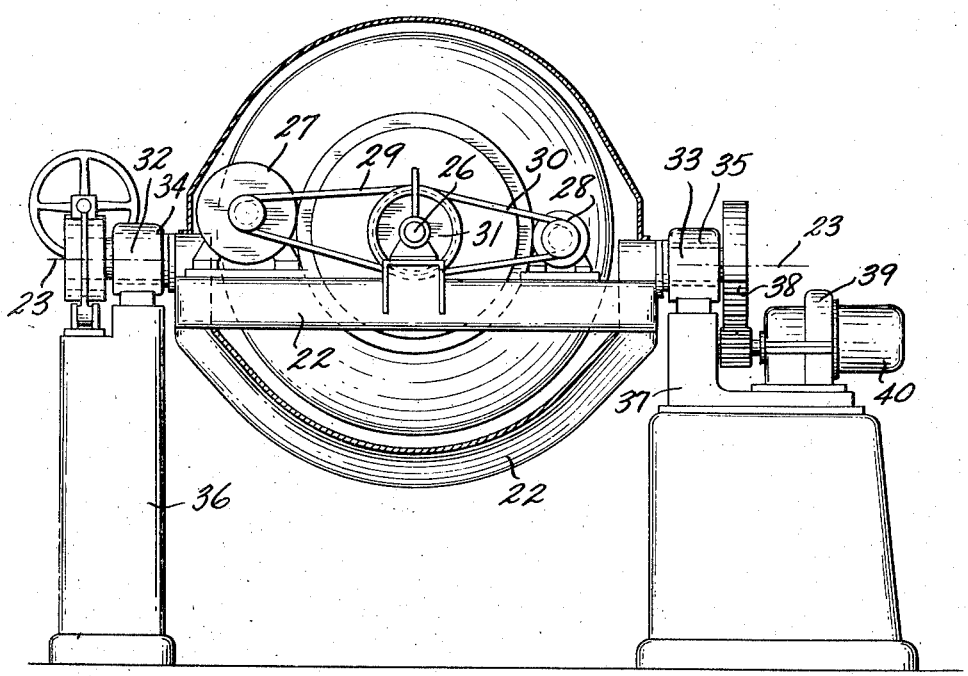
FIG. 2.
INVENTOR.
CARL ANDERS SVERKER
THORSTENSSON-RYDBERG
BY
Campbell, Brumbaugh, Free & Graves
ATTORNEYS.

Aug. 20, 1957 C. A. S. THORSTENSSON-RYDBERG 2,803,529
FAT PROCESSING METHODS
Original Filed April 11, 1951 2 Sheets-Sheet 2

INVENTOR.
CARL ANDERS SVERKER
THORSTENSSON-RYDBERG
BY
Campbell, Brumbaugh, Free + Graves
ATTORNEYS.

2,803,529

FAT PROCESSING METHODS

Carl Anders Sverker Thorstensson-Rydberg, Stockholm, Sweden, assignor to J. R. Andersson & Co. Aktiebolag, Sundbyberg, Sweden, a corporation of Sweden Original application April 11, 1951, Serial No. 220,406, now Patent No. 2,726,069, dated December 20, 1955. Divided and this application April 28, 1955, Serial No. 507,676

4 Claims. (Cl. 31—89)

This is a division of my copending application Serial No. 220,406 for "Fat Processing Apparatus," filed April 11, 1951.

This invention relates to the churning of a fat emulsion and the working of the resulting fat lump and, more particularly, to the production of butter.

As is well known, butter is most commonly produced by subjecting cream of milk to a churning action to cause the particles of fat of the cream to combine into granules of butter, and by thereafter working the butter thus obtained, after separation of the buttermilk, to cause the butter granules to form a single homogeneous lump of butter which contains only a desired quantity of water, mostly in the form of retained buttermilk, and a minimum quantity of entrapped air.

The present invention relates to the production of butter in comparatively large quantities in accordance with the said general method, and it is particularly concerned with the working of the butter after completion of the churning step and removal of the major part of the buttermilk from the mass of granules of butter obtained by the churning of the cream.

It is the primary object of the invention to reduce the time required for working the butter without impairing the quality of the final product.

Another object of the invention is to provide a novel method of working the butter which results in a final product of unusually high quality as regards homogeneousness and freedom from entrapped air.

A further object of the invention is to provide a novel method for processing a lump of fat produced by churning a fat emulsion and working the resulting fat granules.

Other objects of the invention will become apparent from the following detailed description with reference to the accompanying drawings, which illustrate a preferred embodiment of an apparatus in which all the operations necessary for producing butter from cream of milk may be performed.

Figure 4:
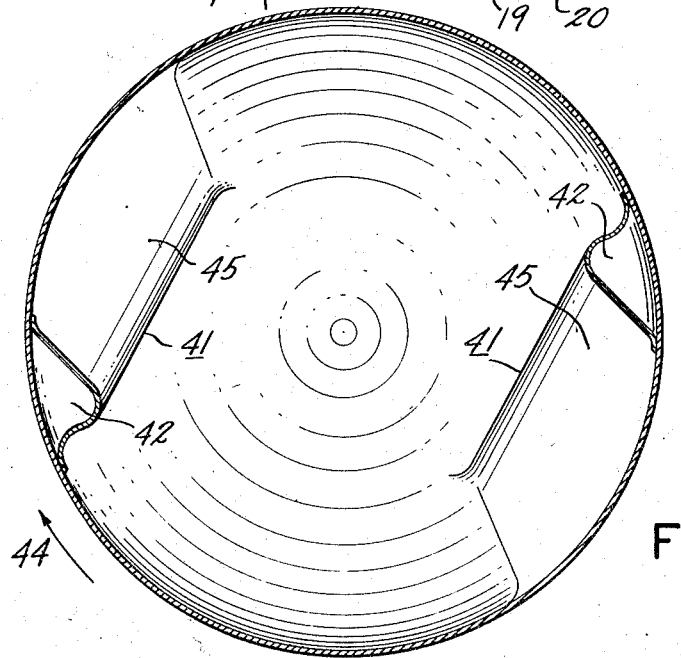

In the drawings:

Figure 1 is a vertical longitudinal section through a butter producing apparatus comprising a rotatable container provided with two internal wings, the axis of rotation of the container being set in a horizontal position, Figure 2 is an end view of the apparatus looking from the left in Figure 1, Figure 3 shows on a larger scale a vertical axial section through the container with one of the wings in operative position, and Figure 4 is a vertical cross section on the line 4—4 in Figure 3.

Referring to the drawings, the container 10 consists of a body of rotation in the form of a barrel or drum having a curved bottom 11. At the bottom end the wall of the container has the form of a cylinder 12 having a length which is preferably substantially equal to the radius of the cylinder. The cylindrical wall portion 12 is continued by a conically tapering wall portion 13. In the embodiment shown, the angle between two oppositely disposed elements of the cone, hereinafter referred to as the top angle of the cone is approximately 80°, the said angle lying generally between the limits 60° and 100°. The conical wall portion 13 is continuous with a short cylindrical portion 14 (Figure 3) which limits the entrance opening of the container. The entrance opening can be closed by means of a lid 15. Provided in the lid 15 is a short pipe 16 for filling cream of milk into and tapping buttermilk from the container, a vent valve 17 and an inspection opening 18 covered with a transparent glass. The bottom 11 and the cylindrical wall portion 12 of the container 10 is surrounded with a jacket 19, between which and the container wall a space 20 is formed through which a heating or cooling medium may be circulated.

The container, which preferably is made of stainless steel, is sand-blasted on the inside so as to prevent a grainy surface which binds a film of water that prevents the butter from sticking to the wall.

The container 10 is journalled for rotation about its axis 21 in a substantially rectangular frame 22, the said frame being tiltable about a horizontal axis 23 which crosses the axis of rotation of the container at right angles. The cylindrical mouth portion 14 of the container 10 forms a pivot which rests in a bearing 24 supported by the frame 22, whereas at the opposite end the container is provided with a pivot pin, not shown, which is secured centrally to the bottom 11 and rests in a bearing, not shown, which also is supported by the frame 22. The last mentioned pivot pin and bearing are enclosed in a casing 25 which also contains a reduction gearing system, the driving shaft 26 of which extends out through the casing. For rotating the drum 10 there are provided two electric motors 27 and 28 of different size, said motors being coupled each by means of a V-belt 29 or 30 respectively to the driving shaft 26 of the reduction gearing through the intermediary of a common pulley 31. The motors 27 and 28 may be used selectively. The larger electromotor 27 is intended to be used for rotating the container 10 at the highest speed required, in the example shown corresponding to a peripheral speed of the cylindrical wall of the container amounting to approximately 3 meters per second, and also for rotating the container at a medium speed, amounting to approximately one third of the highest speed. The motor 27 may consist of a three-phase asynchronous motor in which the change of speed can be effected by re-connecting the poles, for example a Dalander type motor. The smaller motor 28 is intended to be used for rotating the container at the smallest speed required, as a rule amounting to about one tenth of the highest speed. Preferably a motor provided with a reduction gearing is used. To prevent the smaller motor from being driven at an unpermissibly high speed when the container is driven by means of the larger motor, the V-belt pulley on the shaft of the smaller motor is designed as a free wheel. As will be clear from the following the highest speed is required during the step of churning the cream to butter, the intermediate speed during a preliminary working step and the smallest speed during a final working step.

The frame 22 is supported by two pivots 32 and 33 which are coaxial with the tilting axis 23 of the container 10 and rest in bearings 34 and 35 mounted each on a pillar 36 or 37 respectively. Through the intermediary of a reduction gearing system comprising a toothed wheel gear 38 and a double worm gear 39 the pivot 33 is coupled together with a reversible electric motor 40, by means of which the frame 22 and thus also the container 10 can be tilted about the axis 23 to the desired inclination with respect to a horizontal plane.

On the inside of the cylindrical wall portion 12 there are provided two wings 41 of substantially triangular cross section, each wing consisting of a bent plate which is secured at its edges to the drum wall 12, so that between the latter and the wing a space 42 is formed which communicates through a number of openings 43 in the drum wall with the circulation space 20 for the cooling or heating medium. If desired, the part of the drum wall which is defined by the circumference of the wing may be entirely removed. The container 10 is intended to rotate in the direction of the arrow 44, the surface of the wing designated with the reference numeral 45 thus constituting the leading or operating surface of the wing. The wings form with the surrounding walls very large mouldings, so that the wings merge softly into the walls. In the embodiment shown the operating surface of each wing is plane, the imaginary continuation of the operating surface thus intersecting the cylindrical surface 12 along a line 46 which forms part of an ellipse. A tangent 47 to the elliptical line 46 in a point 48 positioned in the middle between the ends of the cylinder walls 12 forms with the generatrix 49 through the same point the angle $\beta$.

The angle $\beta$ is so selected that when the wing 41 is rising, turning its operating surface 45 upwardly, and occupies for instance the position shown in Figure 3, the operating surface 45 will be inclined from the bottom 11 of the container down towards the conical portion 13 of the container. Suitable values of the angle $\beta$ lie between 25° and 45° and preferably between 34° and 40°, the best results being generally obtainable with an angle of 37°.

In the embodiment shown the wing 45 has its largest width adjacent the bottom 11 of the container and its smallest width at the opposite end.

The apparatus described is used and operates in the following manner.

With the aid of the motor 40 the frame 22 is first tilted to such a position that the container 10 will take up a substantially vertical position with its mouth turned upwardly, whereafter the cream and possibly also some acidifying culture is introduced through the short tube 16. Hereafter the frame 22 is swung to such a position that the axis of rotation 21 of the container 10 will form a small angle, for example an angle of 5–10°, with the vertical plane, and the motor 28 is started, the acidifying culture being then, thanks to the wings 41, thoroughly mixed with the cream. After completed mixing the acidifying process is interrupted by circulating a cooling medium through the cooling space, while continuing to rotate the container.

Hereafter the frame 22 is tilted further with the aid of the motor 40 until the axis of rotation 21 of the container 10 forms a considerable angle with a vertical plane, preferably an angle of at least 45° and generally about 90°, and the motor 27 is started with its highest speed, causing the container 10 to rotate about its axis 21 with its highest speed which, as above stated, corresponds to a peripheral speed of the container of the order of magnitude of 3 meters per second. A powerful stirring of the cream in the container then takes place. The said operation or churning is continued until the particles of fat contained in the cream have combined to form small granules having a diameter of about 3 to 4 millimeters, a result generally obtained in about 30 minutes. When the churning operation is completed the motor 27 is stopped and the frame 22 is tilted further until the mouth of the container 10 becomes directed downwardly, whereupon the buttermilk is tapped off through the short pipe 16 after a strainer has been inserted in the pipe.

Hereafter the mass of butter granules is washed in two different amounts of water while the container 10 is being rotated.

After completed washing and removal of the washing water the frame 22 is swung back until the axis of rotation 23 of the container 10 takes up anew a substantially horizontal position, whereupon the motor 27 is started at its lower speed, driving the container at an intermediate speed corresponding to a peripheral speed of about 1 meter per second. The mass of butter consisting of separate granules of fat resting on the wall of the lying cylinder 12 then becomes engaged by the nearest wing 41 and is carried along by the wing when the latter moves up towards its highest position. Immediately before the highest position of the wing has been reached, the mass of butter will roll laterally off the wing and drop freely back onto the cylinder 12 in front of the next wing 41, the said wing in turn lifting the mass of butter and then permitting it to fall, et cetera. Through the impact, which is set up when the mass of butter is arrested by the cylinder 12, the small granules of fat are consolidated, so that finally a single coherent lump of butter is formed from which the greater amount of the residue of the buttermilk or washing water has been pressed out. Said initial working of the butter, hereinafter termed "impact working," is as a rule completed when the container 10 has rotated 10 to 30 revolutions.

When carrying out the impact working of the butter it is of the greatest importance that the container 10 is rotated at a speed, which is so high that the mass or lump of butter does not have time to roll or slide along the wing in the longitudinal direction of the wing before the wing releases the lump of butter. On the other hand, the speed must not be greater than that at which the lump of butter will leave the wing before the latter has reached its highest position or before a second wing has reached its lowest position, so that the lump of butter during its fall will not hit the last mentioned wing and be smashed to pieces against the same.

After the granules of fat in the mass of butter obtained as a result of the churning operation have become consolidated in this manner to a single lump of butter, the amount of buttermilk driven out during the preliminary or impact working and possible residues of washing water are tapped off through the short piece of tube 16 and the required quantity of salt is introduced into the container 10, whereafter the latter is rotated a number of revolutions in its impact working position, causing the salt to become evenly distributed in the lump of butter. Hereafter the butter is permitted to rest for about 30 minutes, during which time the salt becomes dissolved in the entrapped water.

The lump of butter is then subjected to a final treatment or working intended to make the butter more homogeneous, to reduce the air content of the mass, and to cause a better mixing of the salt solution into the butter. The said final working is effected so that the container 10 is set with its axis of rotation 21 substantially horizontal, preferably with the mouth of the container 10 dipping somewhat downwards, whereupon the small motor 28 is started. The said motor rotates the container 10 at its lowest speed, which as a rule amounts to only about one third of the speed during the impact working step and thus in the example chosen corresponds to a peripheral speed of the container of about 0.3 meter per second. The salted lump of butter is now lifted so slowly by one of the wings 41 that the lump of butter has time to roll along said wing from the bottom 11 of the container towards the mouth thereof along the operating surface of the wing 41, which during rotation of the container 10 becomes more and more inclined, until finally the wing tips off the lump of butter in a lateral direction at its lowermost end, whereupon the lump will roll out on the conical portion 13 of the container and thereafter rolls along said conical portion back to the cylindrical portion 12 and along the latter onto the bottom 11 of the container in position in front of the operating surface 45 of the next wing 41, which now will lift the lump of butter, and so on. During its movement along the wing 41 to the conical portion 13 of the container and along the conical portion 13 and the cylindrical portion 12 of the bottom 11 of the container the lump of butter does not turn substantially in a lateral direction with respect to its path of movement, involving that the lump of butter, when it reaches the bottom 11 of the container, will have turned half a revolution with respect to the longitudinal axis of the container. The following wing 41 will thus engage a new side of the lump of butter. Furthermore, it is evident that the lump of butter in its lifted position will come to rest with the said side on the working surface of said wing, and that for each lifting a certain flattening out and folding of the plastic mass of butter will take place. During the rolling movement the lump of butter will continuously change its shape due to the pressure of its own weight, involving a kneading action which relieves the butter of at least part of the entrapped air and makes it more homogeneous.

Any sliding of the lump of butter may be considered as detrimental, since it increases the tendency of the butter to stick to the walls of the container. The sliding should therefore be limited to a minimum and this has been obtained according to a further feature of the invention by rotating at a selected speed a container which is provided with two, and in particularly large apparatus with three or four, wings, is inclined in a definite manner with respect to the axis of rotation, so that the following wing already is substantially in its engaging position, when the lump of butter reaches the bottom of the container, so that it starts to lift the lump of butter immediately. Furthermore, it should be noted that the number of working cycles for each revolution performed by the container becomes proportional to the number of wings, and that as a consequence the time required for completing the working is reduced when the number of wings is increased.

Practical tests have shown that for a combined butter churner and worker in which the container has a diameter of about 1.5 to 1.8 meters, two wings are suitable, whereas three wings can be used to advantage in an apparatus in which the diameter of the container is of the order of magnitude of 2.0 to 2.5 meters.

In the butter producing apparatus illustrated on the drawings and described above in detail, the angle of inclination of the wings 41 and the angle of inclination of the conical wall portion 13 of the container with respect to the axis of rotation thereof are selected large enough to provide an inclined rolling path the steepness of which is at least in the main sufficient in itself to cause the lump of butter to roll down the path. According to a further development of the invention the slope of the inclined path provided by the operative wing and the wall of the container may be increased by periodically changing the angle of inclination of the axis of rotation of the container with respect to a horizontal plane. For said purpose the tilting motor 40 may be synchronized with the driving motor 28 for the container 10 in any suitable manner. Usually an angle of oscillation of the axis of rotation of the container amounting to about 10°–20° is selected. If a sufficiently large angle of oscillation is selected, it will be possible to reduce the angle of inclination of the wings and of the container wall with respect to the axis of rotation, so that, theoretically at least, even a container of cylindrical form provided with wings extending substantially in parallel with its axis may be used to provide, during final working of the butter, the inclined rolling path for the lump of butter.

It should be particularly noted that the method of producing butter described above and the apparatus for carrying out said method shown on the drawings may be used not only for producing butter from cream of milk but also for producing butter-like substances, such as margarine, from other emulsions of fat. The division, according to the invention, of the working of the butter or margarine or other butter-like substance into a preliminary or impact working step and a final or roll-working step has been found to reduce considerably the total time required for working the butter or the like and to result in a product which is extraordinarily homogeneous and practically free from entrapped air.

The invention is, of course, not limited to the embodiment illustrated in the drawings. In practice, the wings are thus not as a rule made with a fully plane operating surface, but the operating surface can for example be made somewhat warped. Furthermore, the wings do not necessarily have to be straight, as in the embodiment shown, but they may for example follow part of a screw line. To relieve the tilting mechanism from shocks caused by the falling lump of butter when suddenly arrested by the wall of the container during the preliminary working of the butter, braking means for holding the frame 22 in any desired tilting position may be provided. Also other modifications are conceivable within the area of the invention.

I claim:

1. The method of working a lump of fat produced from an emulsion of fat which comprises sequentially lifting said lump of fat and gravitationally rolling the same to expel air therefrom and to render said lump homogeneous.

2. The method of working a churned lump of butter which comprises sequentially lifting said lump of butter and gravitationally rolling the same to expel air therefrom and to render said lump homogeneous.

3. The method of producing a homogeneous butter lump comprising the steps of processing cream to obtain granules of butter, impact working the butter granules to form a single lump of butter, and sequentially lifting said butter lump and gravitationally rolling the same to expel air therefrom and to render said lump homogeneous.

4. The method of producing a homogeneous butter lump comprising the steps of churning cream to obtain butter granules, separating a resulting liquid portion of the cream from the butter granules, impact working the butter granules to form a single lump of butter, and sequentially lifting said lump of butter and gravitationally rolling the same to expel air therefrom and to render said lump homogeneous.

References Cited in the file of this patent

UNITED STATES PATENTS

| | | |
|---|---|---|
| 1,020,368 | Pierce | Mar. 12, 1912 |
| 2,200,513 | Mitchel et al. | May 14, 1940 |